US006867884B1

(12) United States Patent
Rozzi

(10) Patent No.: US 6,867,884 B1
(45) Date of Patent: Mar. 15, 2005

(54) HALFTONE DOT PLACEMENT FOR MULTI-COLOR IMAGES

(75) Inventor: William A. Rozzi, Stillwater, MN (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 755 days.

(21) Appl. No.: 09/612,419

(22) Filed: Jul. 7, 2000

(51) Int. Cl.[7] .............................................. H04N 1/52
(52) U.S. Cl. ...................................... 358/1.9; 358/534
(58) Field of Search ......................... 358/1.9, 3.06–3.2, 358/534–536

(56) References Cited

U.S. PATENT DOCUMENTS

| 5,111,310 A | 5/1992 | Parker et al. ................ 358/456 |
| 5,341,228 A | 8/1994 | Parker et al. ................ 358/534 |
| 5,745,660 A | 4/1998 | Kolpatzik et al. ........... 395/108 |
| 5,822,451 A | 10/1998 | Spaulding et al. ........... 382/162 |
| 5,854,882 A | 12/1998 | Wang .......................... 395/109 |
| 6,014,500 A | 1/2000 | Wang .......................... 395/109 |
| 6,020,978 A | 2/2000 | Cooper et al. ................ 358/1.9 |
| 6,025,930 A | 2/2000 | Thompson et al. ........... 358/1.9 |

FOREIGN PATENT DOCUMENTS

| EP | 0 637 886 | 2/1995 |
| EP | 0 812 102 | 12/1997 |
| EP | 0 833 499 | 4/1998 |
| EP | 0 887 998 | 12/1998 |

OTHER PUBLICATIONS

Bayer, "An Optimum Method for Two–Level Rendition of Continuous–Tone Pictures," *IEEE International Conference Communication*, Conference Record, 1973, pp. 26/11–26/15.

Mitsa and Parker, *J. Opt. Soc. Am. A*, 1992, 9(11): 1920–1929.

Nilsson, "Precomputed Frequency Modulated Halftoning Maps that Meets the Continuity Criterion," *IS&T's NIP12: International Conference on Digital Printing Technologies*, 1996, pp. 72–77.

Ulichney, *Proc. Of the IEEE*, 1988, 76:56–79.

Complete History of European Patent Application No. 01 984 204.6–1522, filed Dec. 23, 2002; including: Published International Application No. WO 02/05545 A1, including Search Report Written Opinion dated Apr. 9, 2002; Response to the Written Opinion of Apr. 9, 2002; International Preliminary Examination Report completed Sep. 25, 2002; Notification of European Pub. No. 01984204.6–1522 dated Feb. 26, 2003; Communication from the European Patent Office dated Mar. 4, 2003; Communication from WIPO dated Jul. 1, 2003; Communication from the European Patent Office dated Oct. 7, 2003; Response to the Communication from the European Patent Office of Oct. 7, 2003.

*Primary Examiner*—Thomas D. Lee
*Assistant Examiner*—Stephen Brinich
(74) *Attorney, Agent, or Firm*—Shumaker & Sieffert, P.A.

(57) ABSTRACT

A method for producing halftone dot patterns involves generation of a halftone dot pattern one color channel as a function of the halftone dot pattern generated for another color channel. Placement of dots for one color channel in view of dot placement of one or more other color channels can enhance image quality, promoting improved spacing of dots among the halftone dot patterns generated for the overprinted color channels. Dot placement for a color channel may depend on the number of dots placed for color channels that precede it in the halftoning process. With improved dot spacing in view of inter-channel effects, an inter-channel dot placement method can reduce the incidence of mottle and other image artifacts, improving the visual appearance of the integrated image. A master threshold array may be used to produce halftone dot patterns for all color channels, but applied, in effect, on a shifted basis to promote improved inter-channel dot spacing.

57 Claims, 7 Drawing Sheets

HALFTONE DOT PLACEMENT FOR MULTI-COLOR IMAGES

TECHNICAL FIELD

The invention relates to color imaging and, more particularly, to techniques for halftoning of multi-color images.

BACKGROUND

Reproduction of a continuous-tone image on a halftone printing device, such as an offset press, electrographic printer, inkjet printer, or the like, involves conversion of the continuous-tone image to bi-level data. The conversion process, commonly called halftoning, produces halftone dot patterns that represent continuous-tone imagery when integrated by the human eye. The bi-level data takes the form of a set of color separation bitmaps. Each bitmap corresponds to one of the color channels used by the halftone printing device, e.g., cyan, magenta, yellow, and black (CMYK). The bitmap for each color channel specifies the presence or absence of colorant at a given location on the printed page. In other words, the halftone dot pattern defined by the bitmap specifies the placement of colorant dots within the printed page for the respective color channel.

In general, halftoning techniques fall into one of two categories: dispersed dot or clustered dot. Clustered dot halftoning methods tend to increase the size of one or a small number of ink spots within a given area as the corresponding continuous-tone pixel decreases in lightness. Dispersed dot halftoning techniques, on the other hand, use nearly constant diameter dots and increase the number of dots present in a given area as the continuous-tone pixel lightness decreases. In either case, the objective is generation of a halftone cell containing dots that, when integrated by the human eye, approximate the appearance of the original pixel in the continuous-tone image to be reproduced.

Dot placement according to dispersed dot methods may be either periodic, such as with Bayer ordered dither, or pseudo-random, as with error diffusion and stochastic screening. Stochastic halftone patterns can be implemented using precomputed arrays to avoid extensive calculations in the page rendering process. The arrays can be thought of as masks that are applied to continuous-tone values on a pixel-by-pixel basis for individual color channels to produce halftone dot patterns.

One form of precomputed array is a threshold array. A threshold array, for $M=2^N$ levels, is a two-dimensional array with N-bit integer entries. An alternate form of precomputed array is a halftone "volume," which is a set of M two-dimensional bitmaps corresponding to the M halftone levels. A set of halftone volume bitmaps may be generated from a threshold array. Images reproduced using either a threshold array or halftone volume may be substantially identical in content. In each case, the distribution of dots for each color separation depends on the characteristics of the precomputed threshold array mask.

SUMMARY

The invention is directed to a method for producing halftone dot patterns to generate a multi-color image. The invention also is directed to a computer-readable medium storing program code that implements such a method. A method as described herein permits a halftone dot pattern generated for one color channel to be generated as a function of the halftone dot pattern generated for another channel. In this manner, dot placement is determined on an inter-channel basis, instead of independently. As will be explained, placement of dots for one color channel in view of dot placement for one or more other color channels can enhance image quality, promoting greater spacing of dots among the halftone dot patterns generated for the overprinted color channels.

According to one embodiment of the invention, the method may involve placement of dots in a first halftone dot pattern for a first color channel as a function of a threshold array, and placement of dots in a second halftone dot pattern for a second color channel as a function of both the first halftone dot pattern and the threshold array. The method may be applied for two or more color channels. For example, the method may further involve placement of dots in a third halftone dot pattern for a third color channel as a function of both the second halftone dot pattern and the threshold array, and placement of dots in a fourth halftone dot pattern for a fourth color channel as a function of the third halftone dot pattern and the threshold array. In some embodiments, the process is cumulative. For example, the fourth halftone dot pattern may be generated as a function of the first, second, and third halftone dot patterns along with the threshold array.

The color channels, in some embodiments, may be cyan, magenta, yellow, and black color channels of a halftone printing device. As an example, the first color channel may be the black color channel, the second color channel may be the cyan color channel, the third color channel may be the magenta color channel, and the fourth color channel may be the yellow color channel.

In some embodiments, the order of the color channels may be selected based on relative density of the colorants associated with the channels, for example, from highest to lowest density. In particular, halftoning of the color channels against a single "master" threshold array can be performed from the highest to lowest density channel, e.g., black, then cyan, then magenta, and finally yellow, so that dots with the highest contrast relative to one another are most separated.

Placement of dots in the second halftone dot pattern may involve defining a first dot placement range within the threshold array, and placing dots in the second halftone dot pattern for values in the threshold array that fall within the first dot placement range. Similarly, second and third dot placement ranges within the threshold array may be defined, followed by placement of dots in the third and fourth halftone dot patterns for values in the threshold array that fall within the second and third dot placement ranges, respectively.

The use of a single master threshold array in a conventional manner to form halftone dot patterns independently for different color channels can cause graininess, mottle, and other image artifacts in the multi-color image formed by overprint of the halftone dot patterns. Such image quality defects generally are a result of halftoning the channels independently, i.e., without considering the geometric interaction of dots on an inter-channel basis.

For cyan, magenta, yellow, and black (CMYK) printers, graininess is often present in the highlights due to the high contrast between the paper and either black dots or overprinted cyan and magenta dots (which form a blue component). Black can be excluded from the highlights through proper use of under color removal (UCR) or gray component replacement (GCR), but high-contrast blue dots resulting from overprinted cyan and magenta colorants can be more problematic.

Mottle is produced by an increase in low spatial frequency energy from the overprinted channels. Although the master threshold array is designed to minimize this energy, and the individual channels exhibit a smooth overall appearance, the overprint combination of the channels may not retain this property. As a result of such inter-channel effects, typical halftone images can suffer from the image artifacts described above, degrading image quality.

A halftoning method in accordance with the invention can provide improved image quality in the resulting halftone image by alleviating the effects described above. In particular, when placing dots to produce a halftone dot pattern for one channel, the method takes into account the dot placements made for the other channels. In this manner, the method is effective in keeping the dots placed for the individual channels away from one another for a given set of continuous-tone (contone) values. This differs from channel-independent techniques.

The desired inter-channel dot spacing can be obtained by using the master threshold array for each channel, but placing dots for each channel in succession and in view of the dot placements made for preceding channels. In effect, the threshold array values can be "shifted" or "offset" for each successive color channel based on the dots placed for the preceding channel(s) to avoid excessive overprints that can cause image artifacts. This approach reduces dot reuse between the halftone dot patterns produced for the different color channels.

In one embodiment, the invention provides a method comprising placing dots in a first halftone dot pattern for threshold array values that are less than or equal to a first color pixel value, defining a dot placement range within the threshold array values for a second color pixel value, and placing dots in a second halftone dot pattern for threshold array values that fall within the dot placement range.

In another embodiment, the invention provides a method comprising placing dots in a first halftone dot pattern for threshold array values that are less than or equal to black color pixel value, defining a first dot placement range within the threshold array values for a cyan color pixel value, placing dots in a second halftone dot pattern for threshold array values that fall within the first dot placement range, defining a second dot placement range within the threshold array values for a magenta color pixel value, wherein the second dot placement range has a lower bound as a function of the sum of the first and second color pixel values and an upper bound as a function of the sum of the first, second, and third color pixel values, placing dots in a third halftone dot pattern for threshold array values that fall within the second dot placement range, defines a third dot placement range within the threshold array values for a yellow color pixel value, wherein the third dot placement range has a lower bound as a function of the sum of the first, second, and third color pixel values and an upper bound as a function of the sum of the first, second, third, fourth color pixel values, and placing dots in a fourth halftone dot pattern for threshold array values that fall within the third dot placement range.

In a further embodiment, the invention provides a computer-readable medium containing program code that, when executed by a processor, places dots in a first halftone dot pattern for threshold array values that are less than or equal to a first color pixel value, defines a dot placement range within the threshold array values for a second color pixel value, and places dots in a second halftone dot pattern for threshold array values that fall within the dot placement range.

In an added embodiment, the invention provides a computer-readable medium containing program code that, when executed by a processors, places dots in a first halftone dot pattern for threshold array values that are less than or equal to black color pixel value, defines a first dot placement range within the threshold array values for a cyan color pixel value, places dots in a second halftone dot pattern for threshold array values that fall within the first dot placement range, defines a second dot placement range within the threshold array values for a magenta color pixel value, wherein the second dot placement range has a lower bound as a function of the sum of the first and second color pixel values and an upper bound as a function of the sum of the first, second, and third color pixel values, places dots in a third halftone dot pattern for threshold array values that fall within the second dot placement range, defines a third dot placement range within the threshold array values for a yellow color pixel value, wherein the third dot placement range has a lower bound as a function of the sum of the first, second, and third color pixel values and an upper bound as a function of the sum of the first, second, third, fourth color pixel values, and places dots in a fourth halftone dot pattern for threshold array values that fall within the third dot placement range.

In another embodiment, the invention provides a method comprising placing dots in a first halftone dot pattern for a first color channel as a function of a threshold array, and placing dots in a second halftone dot pattern for a second color channel as a function of the first halftone dot pattern and the threshold array.

In an additional embodiment, the invention provides a computer-readable medium containing program code that, when executed by a processor, places dots in a first halftone dot pattern for a first color channel as a function of a threshold array, and places dots in a second halftone dot pattern for a second color channel as a function of the first halftone dot pattern and the threshold array.

The details of one or more embodiments of the present invention are set forth in the accompanying drawings and the description below. Other features, objects, and advantages of the present invention will be apparent from the description and drawings, and from the claims.

DETAILED DESCRIPTION

Figure 1:
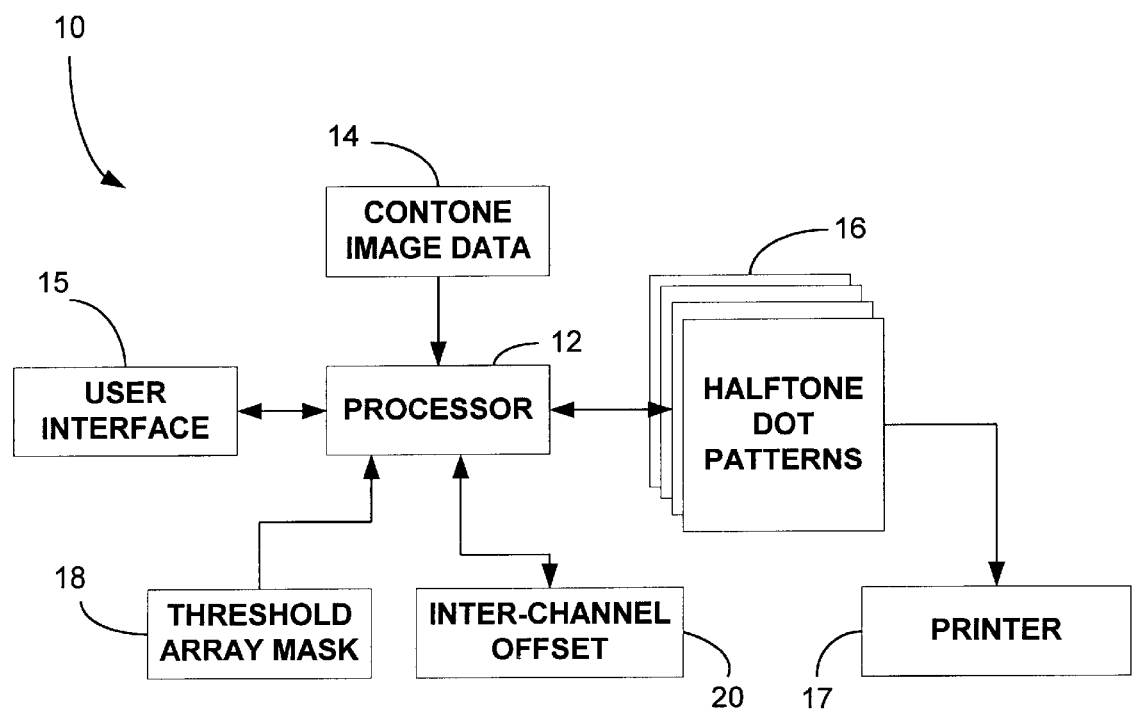
FIG. 1 is a block diagram illustrating a system for generating halftone dot patterns.

FIG. 1 is a block diagram illustrating a system 10 for generating halftone dot patterns. As shown in FIG. 1, system 10 may include a processor 12 that accesses a source of continuous tone ("contone") image data 14. A user interface 15 can be provided for user interaction with system 10, e.g., to initiate a print operations and selecting print settings such as application of a desired halftone mask. Processor 12 produces halftone dot patterns 16 for different color channels based on contone image data 14. The halftone dot patterns 16 are applied to a printer 17 to drive the reproduction of the image represented by the original contone image data 12.

Processor 12 accesses a threshold array mask 18 and applies it to contone image data 14 to produce halftone dot patterns 16. In addition, processor 12 maintains an inter-channel offset 20 that permits use of the same threshold array mask 18 for different color channels, but promotes improved inter-channel dot spacing for improved image quality. Inter-channel offset 20 serves to set a range of threshold values within threshold array mask 18 for each of the color channels based on dot placements made for preceding channels to which the threshold array mask is applied. The offset can be made cumulative such that reuse of dots in the halftone dot patterns produced for each color channel is reduced.

Processor 12 may take the form of any general or special purpose microprocessor and can be integrated with or form part of a PC, Macintosh, or computer workstation. User interface 15 may include a conventional keyboard and pointing device such as a mouse or trackball, if desired. User interface 15 also may include a computer monitor, such as a CRT or flat panel display, that provides textual and/or graphic feedback to the user. Contone image data 14, threshold array mask 18, and inter-channel offset 20 may be stored in memory, along with program code accessed and executed by processor 12. For executables, the memory may take the form of random access memory (RAM) to implement a method as described herein. The program code and other contents of the memory can be loaded into RAM from another memory device, such as a ROM, fixed hard drive, or removable media device associated with system 10. In particular, appropriate program code can be initially carried on computer-readable media such as magnetic, optical, magneto-optic or other disk or tape media. Alternatively, the program code can be carried on electronic computer-readable media such as EEPROM, or accessed over a local, wide area, or global computer network.

In operation, processor 12 receives contone image data 14 representative of a multi-color color image for reproduction on printer 17. Contone image data 14 may take the form of an image file defining continuous tone pixel values for each of the individual pixels in the image. Processor 12 applies threshold array mask 18 and inter-channel offset 20 to contone image data 14 to produce successive color separation bitmaps defining halftone dot patterns 16 for different device colorants, e.g., cyan, magenta, yellow, and black (CMYK). Processor 12 transmits the finished color separation bitmaps or streams them to printer 17 as they are produced to drive reproduction of the original continuous-tone image on output media such as paper or film. The color separation bitmaps can be packaged in conventional imaging formats and raster input processed by printer 17 or a RIP server associated with the printer.

Figure 2:
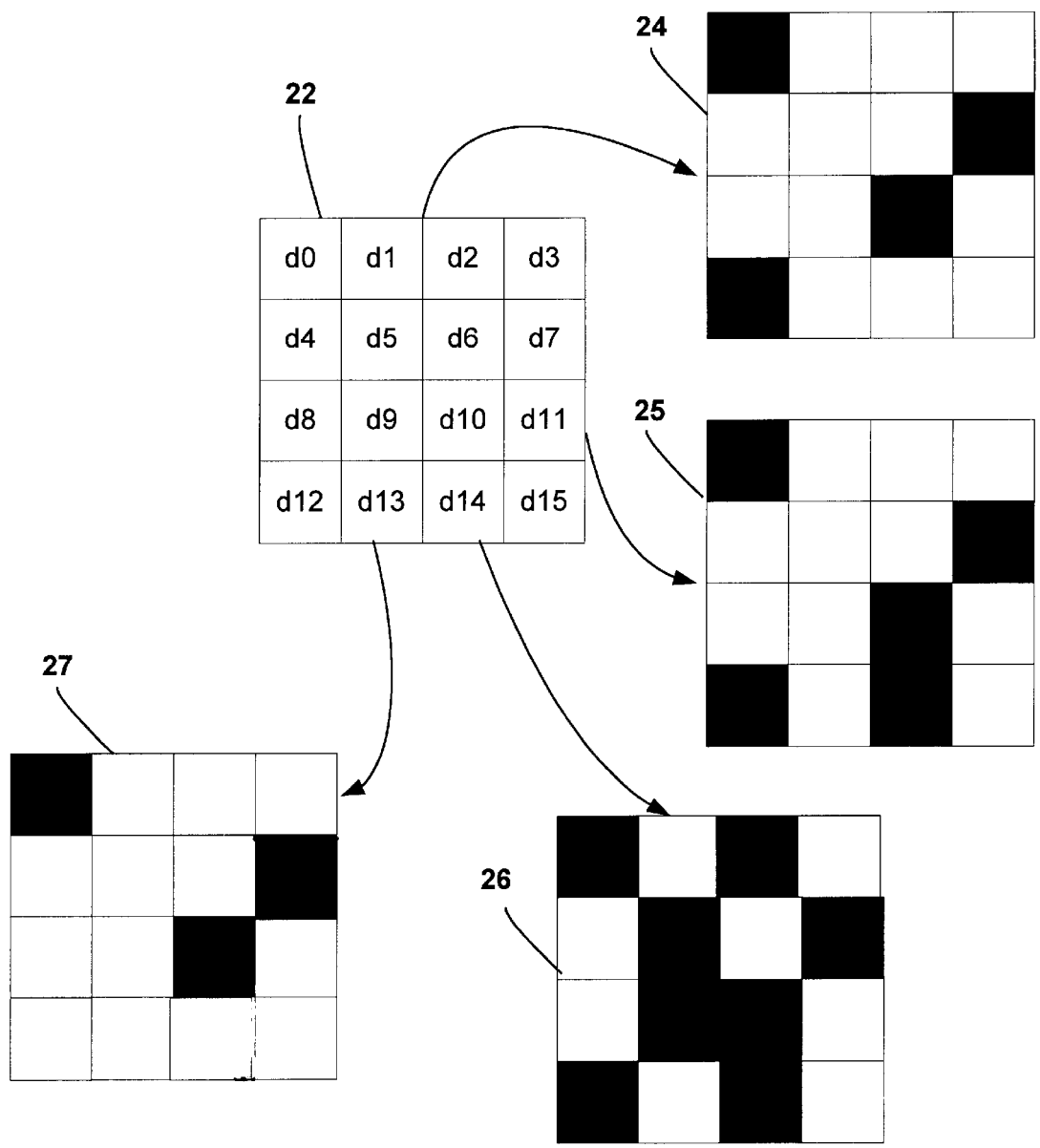
FIG. 2 is a simplified diagram illustrating application of a threshold array mask to form halftone dot patterns for different color channels.

FIG. 2 is a simplified diagram illustrating application of a threshold array mask 22 to form halftone dot patterns 24, 25, 26, 27 for four different color channels. In the example of FIG. 2, threshold array mask 22 and halftone dot patterns 24, 25, 26, 27 are greatly simplified to facilitate illustration of the concept of threshold array halftoning. As shown in FIG. 22, threshold array mask 22 has sixteen dot positions d0–d15 and sixteen array values associated with the dot positions, including a zero which corresponds to no dot placements. Each dot position corresponds to a pixel position associated with one color channel in a continuous-tone image. The pixel position in the continuous-tone image has a color pixel value defining a color intensity. In practice, threshold array mask 22 typically has a much higher number of entries than the sixteen shown for purposes of illustration in FIG. 2. In many applications, for example, threshold array mask 22 may have $2^8$, or 256 entries. Also, in practice, threshold array mask 22 may be, in effect, tiled across the continuous tone image to provide an array of small-area halftone dot patterns that together produce an overall halftone dot pattern mosaic for the image.

Each dot position d0–d15 in mask 22 sets a threshold value for dot placement. The threshold value at a dot position d0–d15 is compared to a color pixel value in the continuous tone image on which threshold array mask 22 is overlaid. If the threshold value at the corresponding dot position d0–d15 is less than or equal to the color pixel value, then a dot is placed at that position. If the threshold value is greater than the color pixel, then a dot is not placed at that position. Application of the color pixel values to the threshold values at dot positions d0–d15 results in a pattern of dots, i.e., a halftone dot pattern.

The dot positions d0–d15 in threshold array mask 22 of FIG. 2 are numbered in ascending order for addressing purposes, but have threshold values that are determined according to a halftoning mask. In a preferred embodiment, threshold values for dot positions t0–t15 are assigned according to a stochastic method, producing a dispersed dot pattern according to a pseudo-random function. A blue noise function, for example, has been observed to provide a visually acceptable distribution of threshold values for halftone imaging. The blue noise function can be precomputed to form mask 22, which can be stored in memory as a two-dimensional array of dot positions d0–d15 with associated threshold values.

In the example of FIG. 2, threshold array mask 22 is applied to a corresponding area of a continuous-tone image to produce a halftone dot pattern 24 for a first color channel, a halftone dot pattern 25 for a second color channel, a halftone dot pattern 26 for a third color channel, and a halftone dot pattern 27 for a fourth color channel. In most applications, a threshold array mask 22 is applied to four or more color channels, e.g., cyan, magenta, yellow, and black. In the example of FIG. 2, it is assumed that dot positions d0–d15 have sixteen different threshold values ranging from zero to fifteen, where zero corresponds to a placement of zero dots in the halftone dot pattern for a continuous-tone color pixel value of zero. It is further assumed that the threshold values are distributed according to a stochastic method such as a blue noise function, and that corresponding pixel values for a first color channel all have a value of four, while corresponding pixel values for second, third, and fourth color channels all have a value of five, eight, and three, respectively. Halftone dot pattern 24 corresponds to the first color channel, and shows a placement of four dots. Halftone dot pattern 25 corresponds to the second color channel, and shows a placement of five dots. Halftone dot pattern 26 corresponds to the third color channel, and shows a placement of eight dots. Halftone dot pattern 27 corresponds to the fourth color channel, and shows a placement of three dots.

Because the same threshold array mask 22 is applied to each color channel, halftone dot patterns 24, 25, 26, 27 share several dot placements in common. In the example of FIG. 2, dot reuse occurs at dot positions d0, d7, d10, and d12 for halftone dot patterns 24, 25, 26, and at dot positions d0, d7, and d10 for halftone dot pattern 27. In second halftone dot pattern 25, only the fifth dot is placed in a non-overlapping position with first halftone dot patter 24, because the first and second halftone dot patterns do not share that dot in common. Third halftone dot pattern 26 shares the four dots of first halftone dot pattern 24, however, plus the fifth dot of second halftone dot pattern 25.

Dot reuse, as illustrated in FIG. 2, can cause image quality problems. In particular, the use of a single "master" threshold array 22 to form halftone dot patterns for different color channels can cause graininess, mottle, and other image artifacts in the multi-color image formed by overprint of the two, three, four, or more halftone dot patterns. The image quality defects generally are a result of halftoning the channels independently, i.e., without considering the geometric interaction of dots from all channels. Low spatial frequency energy in the overprinted channels produces mottle. The master threshold array mask 22 is designed to minimize this energy, but the reuse of dots in the overprint combination of the channels can undermine the benefit of the mask.

A halftoning method in accordance with an embodiment of the invention can provide improved image quality by reducing the degree of dot reuse, and promoting increased dot spacing between the halftone dot patterns formed for the different color channels. The method still permits the use of a master threshold array mask, if desired, but introduces an offset that takes into account the dot placements made for other channels. Dots are placed in succession for each channel. In effect, the threshold array values are offset or shifted for each successive color channel based on the dots placed for the preceding channel or channels to avoid excessive overprints that can cause image artifacts. The method can be executed by processor 12 during application of threshold array mask 22 to contone image data 14. In one embodiment, processor 12 processes the color channels in order from highest to lowest density, e.g., black, cyan, magenta, and yellow, and maintains an inter-channel offset based on the number of dots placed for preceding color channels to reduce dot reuse.

Figure 3:
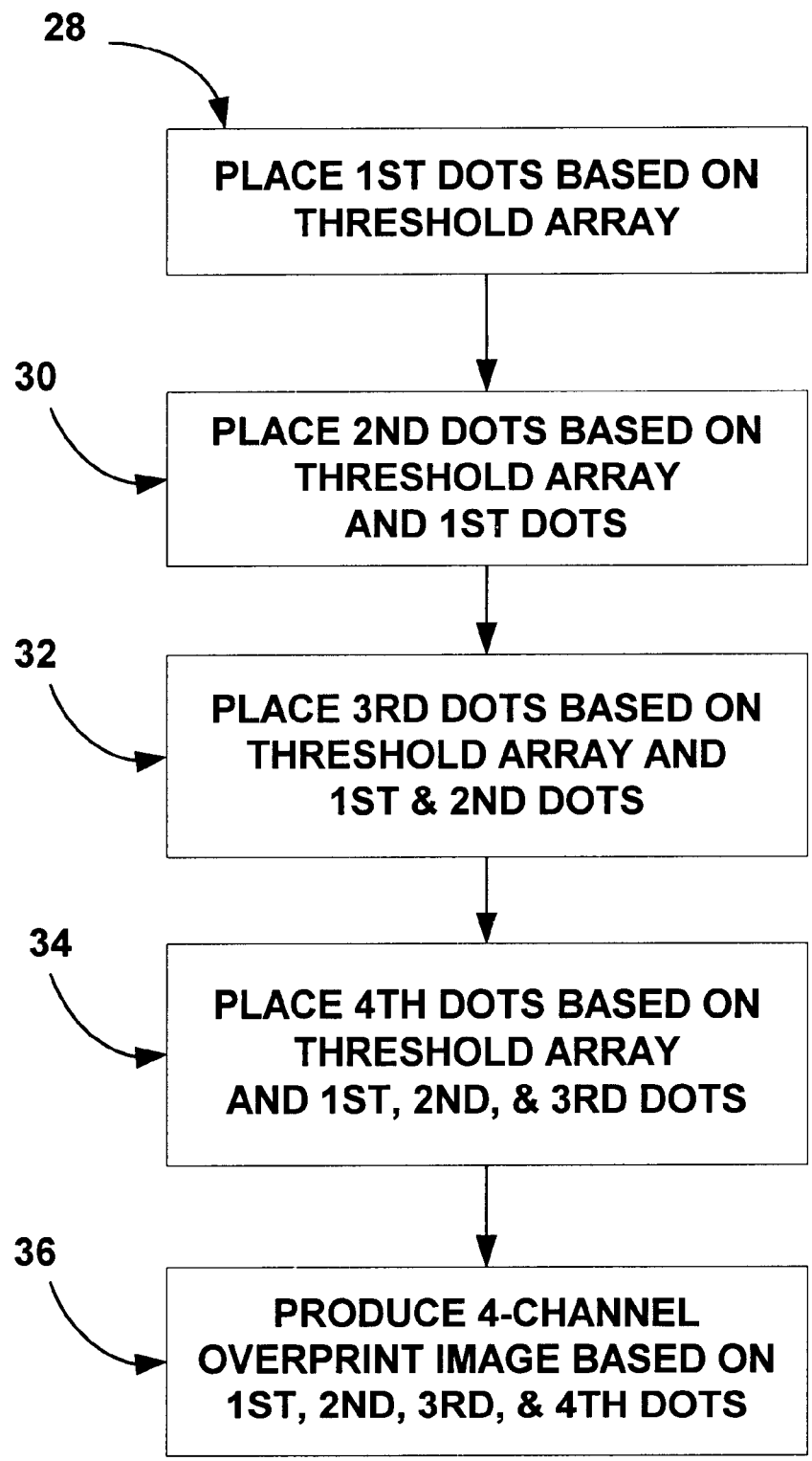
FIG. 3 is a flow diagram illustrating a method for generating halftone dot patterns for different color channels for improved inter-channel dot spacing.

FIG. 3 is a flow diagram illustrating, in general, a method for generating halftone dot patterns according to one embodiment of the invention. A method as shown in FIG. 3 involves placing first dots in a first halftone dot pattern (28) based on a comparison of a threshold array to corresponding continuous-tone pixel values. The first halftone dot pattern corresponds to a first color channel. According to the method, second dots are placed in a second halftone dot pattern (30) based on the threshold array mask and the first dots placed in the first halftone pattern. The second halftone pattern corresponds to a second color channel. The method also involves placement of third dots in a third halftone dot pattern (32), which corresponds to a third color channel, based on the threshold array mask and both the dot placements for the first and second color channels. Finally, fourth dots are placed in a fourth halftone dot pattern (34), which corresponds to a fourth color channel, based on the threshold array mask and the dot placements for the first, second, and third color channels. With the resulting halftone dot patterns, printer 17 is able to produce a four-channel overprint image using the first, second, third, and fourth dots (36).

The manner in which processor 12 places dots based on dot placements for preceding channels involves calculation of inter-channel offset 20, as shown in FIG. 1. The result is improved dot spacing. For the first color channel, the value of inter-channel offset 20 ordinarily will be zero, because there are no dot placements preceding the first color channel. For a second color channel, however, the value of inter-channel offset 20 is a function of the dot placements made for the first channel. For a third color channel, the value of inter-channel offset 20 is a function of the dot placements made for both the first and second channels. For the fourth color channel, the value of inter-channel offset 20 is a function of the dot placements made for the first, second, and third channels. Thus, inter-channel offset 20 is cumulative over the number of color channels handled by processor 12. Inter-channel offset 20 may be generated in a similar manner for subsequent channels in the event more than four channels are used by the intended printing device, e.g., for high-fidelity color systems incorporating added colorants such as fluorescent green, fluorescent orange, and the like.

Processor 12 uses inter-channel offset 20 to define a dot placement range within the range of threshold array values made available in threshold array mask 18. Dots are placed in the pertinent halftone dot pattern for threshold array values that fall within the dot placement range. The dot placement range has a lower bound that depends on the values of a preceding color pixel value, i.e., for a corresponding pixel in a color channel that was halftoned in a previous step. The lower bound corresponds to the value of inter-channel offset 20, and serves to move the threshold range upward for each successive channel to avoid dot reuse. The dot placement range also has an upper bound that depends on both the preceding color pixel value and the present color pixel value. If the threshold value for a particular dot position is greater than the lower bound and less than or equal to the upper bound, a dot is placed.

In this manner, dot placement for successive color channels is varied to avoid excessive dot overlap for common pixel value ranges. More particularly, as an initial step, dots are placed for a first color pixel value for threshold array values that are less than or equal to the first color pixel value. The resulting dot placement defines a first halftone dot pattern. The first color pixel value may be a pixel value for any of the device colorants, such as cyan, magenta, yellow, or black. In a preferred embodiment, the first color channel to be halftoned is the black color channel, followed by cyan, magenta, and yellow. This halftoning sequence proceeds in descending order of colorant density, such that the most dense colorant, black, is halftoned first, and the least dense colorant, yellow, is halftoned last. With this approach, the greatest separation of dot spacing can be obtained, in most instances, between the color channels with the greatest density difference, i.e., contrast with respect to the substrate.

After placing dots for the first color pixel value, e.g., for the black channel, processor 12 defines a dot placement range within the threshold array values for a second color pixel value, e.g., cyan. Processor 12 then places dots in a second halftone dot pattern for dot positions having threshold array values that fall within the dot placement range. For the second color channel, the dot placement range has a lower bound that is a function of the first color pixel value and an upper bound that is a function of the sum of the first and second color pixel values. Dots are placed in the second halftone dot pattern for threshold array values that are greater than or equal to the lower bound and less than or equal to the upper bound. In this way, the dots placed for the first color pixel value are not reused (or are reused to a lesser degree) for the second color channel, avoiding excessive dot overprints and inter-channel effects that can undermine image quality.

For a third color channel, e.g., magenta, processor 12 defines a second dot placement range within the threshold array values. The second dot placement range has a lower bound that is a function of the sum of both the first and second color pixel values. The upper bound of the second dot placement range is a function of the sum of the first, second, and third color pixel values. Thus, the offset applied to each of the successive color channels is cumulative, thereby avoiding to the extent possible reuse of dots within the threshold array. For the third color channel, dots are placed in a third halftone dot pattern for threshold array values that fall within the second dot placement range, i.e., for threshold array values that are greater than or equal to the lower bound of the second dot placement range and less than or equal to the upper bound of the second dot placement range. The second dot placement range starts at the upper bound of the first dot placement range, and thereby generally prevents reuse of dots between the first, second, and third color values.

For a fourth color channel, e.g., yellow, processor 12 defines a third dot placement range within the threshold array values for a fourth color pixel value. The third dot placement range has a lower bound that is a function of the sum of the first, second, and third color pixel values, and an upper bound that is a function of the sum of the first, second, third, fourth color pixel values. Again, the effective offset applied to the threshold array value for each successive color channel is cumulative of the offsets applied for preceding color channels. Upon definition of the third dot placement range, processor 12 places dots in a fourth halftone dot pattern for threshold array values that fall within the third dot placement range. In particular, processor 12 places dots in the fourth halftone dot pattern for threshold array values that are greater than or equal to the lower bound of the third dot placement range and less than or equal to the upper bound of the third dot placement range. In this manner, reuse of dots between the first, second, third, and fourth color pixel values is generally avoided.

Notably, if any of the color pixel values exceeds the maximum threshold value, upon application of a dot placement range, it is necessary to "roll over" or "wrap around" the range. In other words, when a color pixel value exhausts the number of available threshold array values between the lower bound of the pertinent dot placement range and the maximum threshold array value, it is necessary to reuse some of the threshold array values at the beginning of the threshold array value range as part of the pertinent dot placement range. In this case, a significant amount of dot reuse may occur, but only to the extent a color pixel value exceeds the maximum threshold array value upon definition of the dot placement range, i.e., application of inter-channel offset 20. As an example, if 256 threshold values are available, and an inter-channel offset of 100 is applied, a value of 160 becomes 260, which exceeds the available number of threshold values. The "wrap-around" can be achieved by applying a simple "mod" (remainder) function with the color pixel value and the maximum threshold array value as arguments. The result is a "wrap-around" value that operates as the effective upper bound of the pertinent dot placement range. Wrap-around may occur as many as N−1 times when processing a pixel in an image with N color channels.

Figure 4:
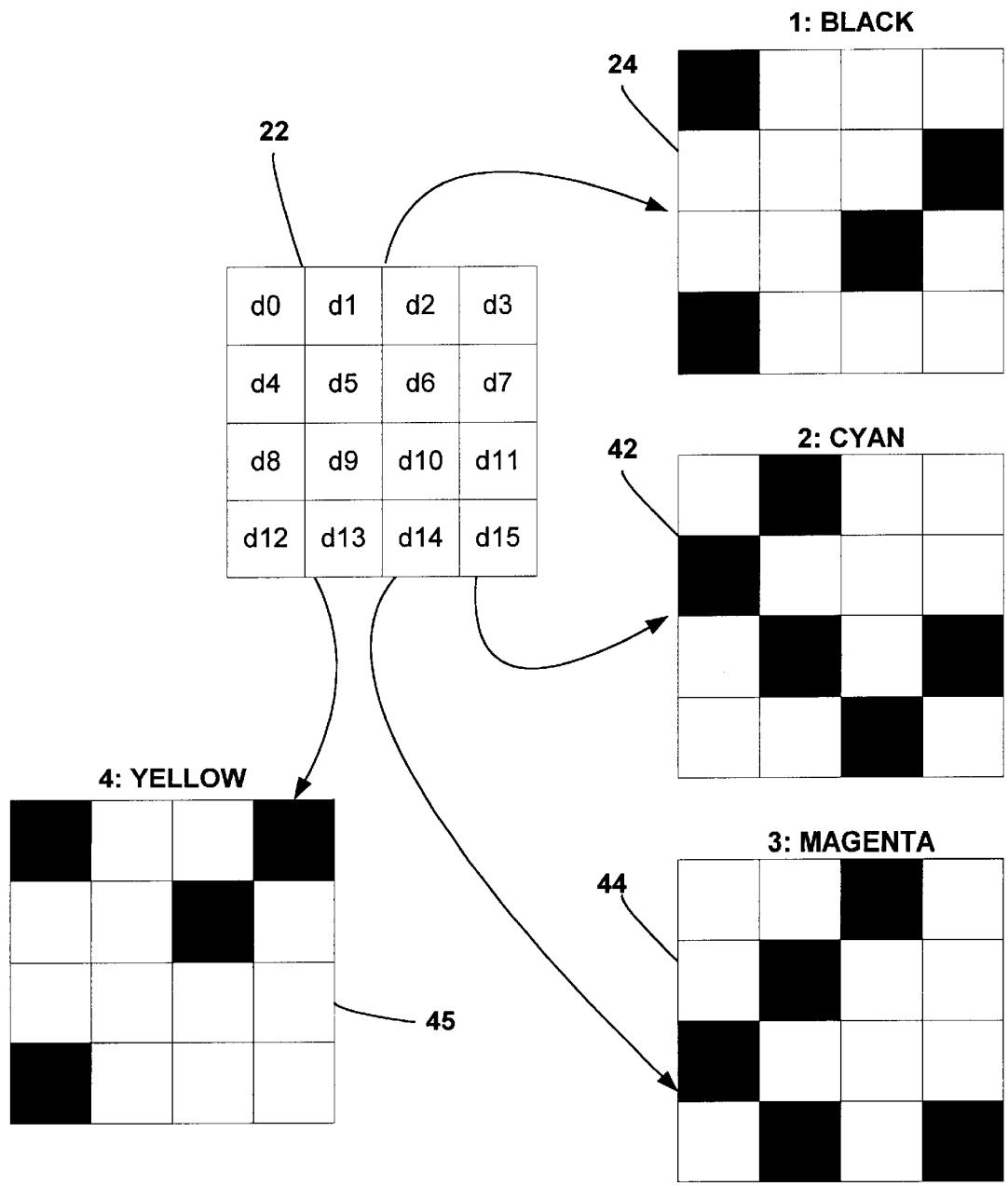
FIG. 4 is a simplified diagram illustrating application of a threshold array mask using method for improved inter-channel dot spacing.

FIG. 4 is a simplified diagram illustrating application of a threshold array mask using a method for inter-channel dot spacing. As in the example of FIG. 2, threshold array mask 22 has sixteen dot positions d0–d15 and sixteen threshold values. As shown in FIG. 4, threshold array mask 22 is applied to black, cyan, magenta, and yellow color channels to produce four color separation bitmaps based on the resulting halftone dot patterns. In particular, application of threshold array mask 22 produces a first halftone dot pattern 24 for black, a second halftone dot pattern 42 for cyan, a third halftone dot pattern 44 for magenta, and a fourth halftone dot pattern 45 for yellow. According to the method described herein, threshold array mask 22 is applied to the black, cyan, magenta, and yellow color channels in succession.

By generating dot placement ranges based on the dots placed for the preceding channels, the method avoids dot reuse, as illustrated in FIG. 4. It is assumed that the black color pixel value calls for placement of four dots, the cyan color pixel value calls for placement of five dots, the magenta color pixel value calls for placement of five dots, and the yellow color pixel value calls for placement of four dots. Notably, applying a dot placement range that relies on preceding dot placements and a resulting inter-channel offset 20, dot reuse does not occur until the d0 and d12 dots are reused for the yellow halftone dot pattern 45. In the example of FIG. 4, there is no reuse of dots between the black, cyan, and magenta halftone dot patterns 24, 42, 44. Thus, each halftone dot pattern includes a number of dot placements proportional to corresponding continuous-tone color pixel values. The dots are spaced from one another, however, to improve overprint image quality.

Figure 5:
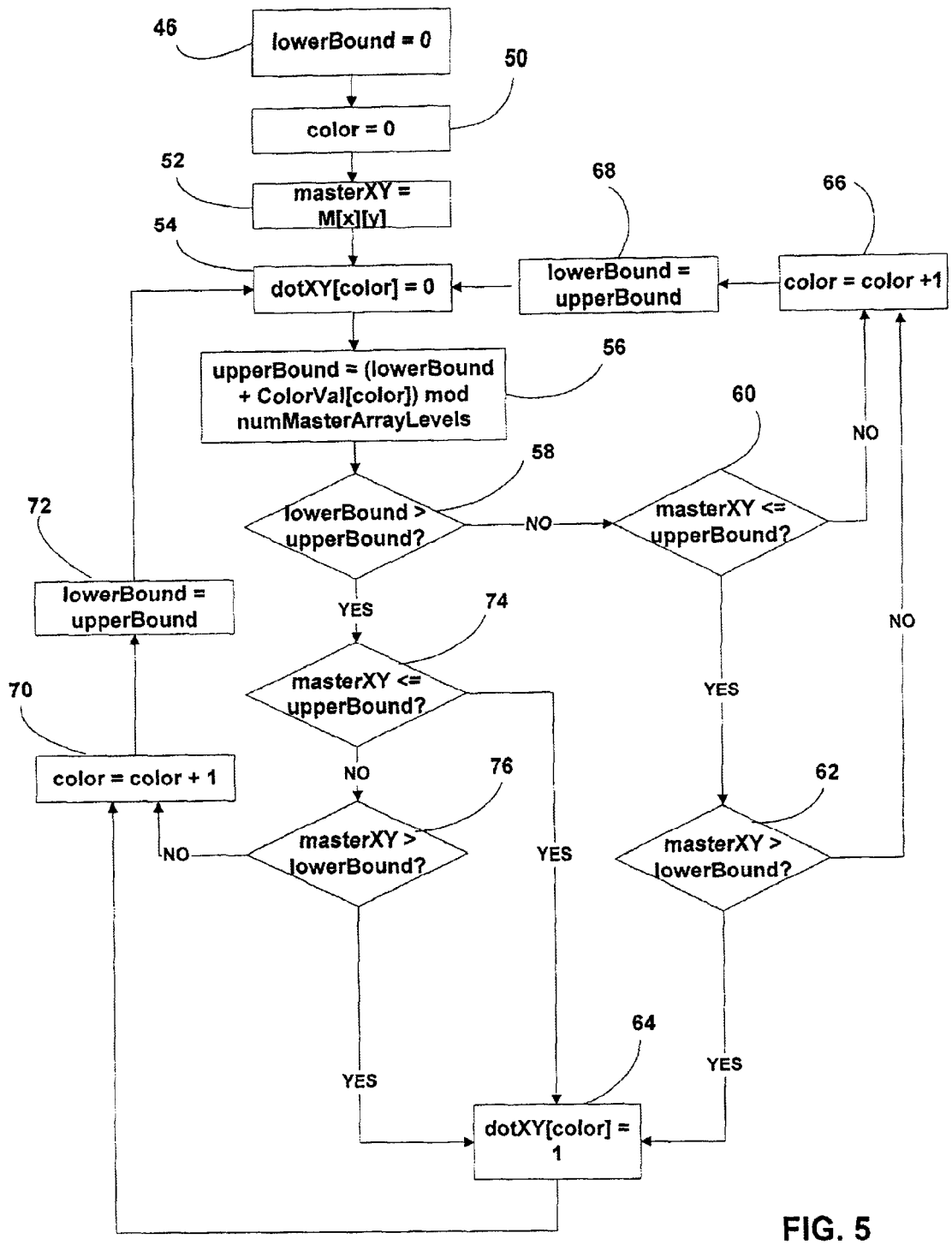
FIG. 5 is a flow diagram illustrating a method as shown in FIG. 3 in greater detail.

FIG. 5 is a flow diagram illustrating a method as shown in FIG. 3 in greater detail. As shown in FIG. 5, for application of the halftoning method to a particular continuous tone pixel value, processor 12 first sets the values "lowerBound" (48) and "color" (50) to zero. The value "lowerBound" corresponds to the lower bound of the dot placement range to be set by the method. For the first color channel, e.g., black, the lower bound will be zero. The value "color" corresponds to the particular color channel being processed, where color=0 identifies the black channel, color=1 identifies the cyan channel, color=2 identifies the magenta channel, and color=3 identifies the yellow channel. Processor 12 also sets the value masterXY=M[x][y], where masterXY is the threshold value retrieved from a master threshold array mask M at a particular pixel position x, y (52). Finally, processor 12 sets the value dotXY[color] to zero (54). The value dotXY[color] indicates whether a dot is to be placed at the corresponding x, y position in the halftone dot pattern for the respective color. A dot is to be placed when dotXY[color]=1.

Upon setting the above values, processor 12 begins an iterative loop, in which dots placement is determined for a pixel for successive color channels. Processor 12 sets the value "upperBound" to be equal to the lowerBound value plus ColorVal[color] subject to application of the mod function to that sum and numMasterArrayLevels (56). The "upperBound" value is the upper bound of the dot placement range, while the ColorVal[color] value is the continuous tone pixel value of the pertinent pixel for the present color channel. The value "numMasterArrayLevels" is the maximum threshold value assigned in the threshold array mask M. As will be explained, the mod function serves to "wrap around" the upperBound value when it exceeds the maximum threshold value numMasterArrayLevels. The wrap-around produced by the mod function tends to reduce the low-spatial frequency energy of the dot distribution for a particular color, avoiding dot reuse and overprinting until it is necessary.

In each iteration, the lowerBound is increased according to the value of the upperBound in the preceding iteration. As a result, the increasing upperBound value may exceed numMasterArrayLevels for some pixel values. To determine whether a wrap-around value for upperBound is necessary, processor 12 compares the lowerBound and upperBound values to determine which is greater (58). If the lowerBound is greater than the upperBound, the mod function applied in the upperBound calculation (56) has caused the upperBound to wrap around to the beginning of the threshold array values. If the lowerBound is not greater than the upperBound, processor 12 next determines whether the masterXY value, i.e., the pertinent threshold value in the mask M, is less than or equal to the upperBound (60). If so, processor 12 determines whether the masterXY value is greater than the lowerBound (62).

If both conditions (60, 62) are satisfied, processor 12 records a dot placement by setting dotXY[color] to 1 (64). This amounts to an "AND" operation in which the masterXY value must be both less than or equal to the upperBound (60) and greater than the lowerBound (62). If either of the conditions is not satisfied, processor 12 does not set dotXY[color] to 1, and instead increments the color value by one to correspond to the next color channel (66). In addition, processor 12 sets the lowerBound to equal the upperBound (68), thereby applying the inter-channel offset, and begins the next iteration (54). Likewise, if both conditions (60, 62) are satisfied, and dotXY[color] is set to one (64), processor 12 increments the color (70), and sets the lowerBound equal to the upperBound (76) for the next color channel iteration.

If the lowerBound is greater than the upperBound (58), processor 12 applies a wrap-around calculation. In particular, processor 12 determines whether masterXY is less than or equal to upperBound (74). If so, processor 12 sets dotXY[color] to 1 (64). If not, processor 12 determines whether masterXY is greater than lowerBound (76). If so, processor 12 sets dotXY[color] to 1 (64). If not, processor 12 increments color by one (70) to transition to the next color channel for the next iteration, and sets lowerBound equal to upperBound (72). In this manner, processor 12 places a dot if masterXY falls with the range between lowerBound and numMasterArrayLevels or within the range between zero and the "wrap-around" upperBound. This amounts to an "OR" operation. The process continues to iterate until dot placements have been determined for corresponding pixels in each of the color channels. Then, the processor moves onto the next pixel, defined by new x,y coordinates, and continues until all pixels for all color channels have been processed.

A process as shown in FIG. 5 can be readily implemented in program code executed by processor 12. The following are exemplary lines of C source code appropriate for implementation of this process:

```
lowerBound = 0
masterXY = M[x][y];    // master array value at this x-y location
// dotXY is pointer to numColors bits indicating presence or absence of
// dots colorVal is a pointer to numColors contone color values; color
//    order should be arranged from highest to lowest in density (typically
     K, C, M, Y)
for(color=0; color<numColors: color++) {
  dotXY[color] = 0;
  upperBound=(lowerBound + colorVal[color]) %
  // numMasterArrayLevels; detect and handle wraparound of
  LUT indices
  if(lowerBound > upperBound) {
    // wraps; handle it (operation is OR)
    if( (masterXY<=upperBound) || (masterXY > lowerBound))
       dotXY[color] = 1;
  }
```

-continued

```
  else {
    // no wrap; operation is AND
    if( (masterXY<=upperBound) && (masterXY > lowerBound) )
       dotXY[color] = 1;
  }
  lowerBound = upperBound;   // update lower bound for next iteration
}
```

The process illustrated by the above C source code can be executed on an iterative basis to determine dot placement for all pixel positions within the threshold array mask, and for all color channels. The process can be repeated on a tiled basis, in effect, by overlaying the threshold mask at different areas of the continuous tone image to be halftoned, creating a halftone dot pattern mosaic.

Figure 6:
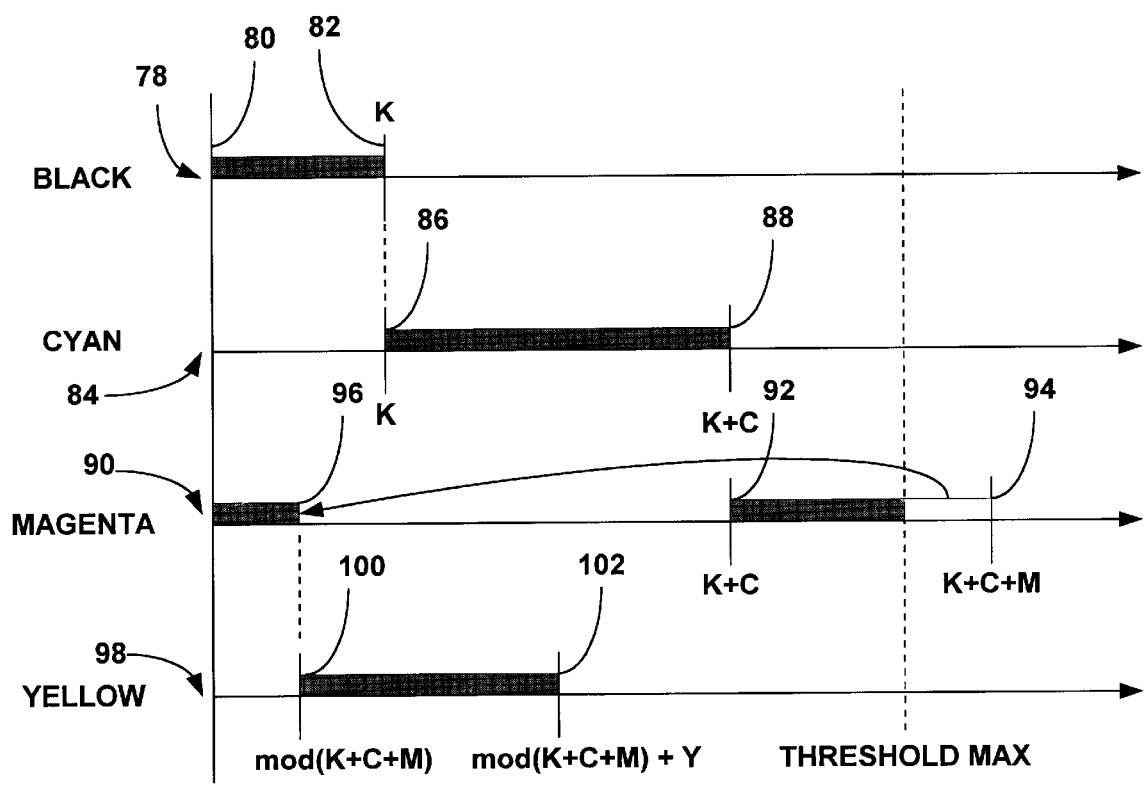
FIG. 6 is a graph illustrating application of a method for improved inter-channel dot spacing to a range of threshold array values.

FIG. 6 is a graph illustrating application of a method for improved inter-channel dot spacing to a range of threshold array values. The graph of FIG. 6 includes a linear graph for each of the black, cyan, magenta, and yellow color channels, showing the continuous tone value and, in effect, the number of dots placed for each color channel according to a method in accordance with an embodiment of the present invention. In particular, the black channel graph 78 begins with a dot placement range having a lower bound 80 of zero and an upper bound 82 of K. The upper bound value K is the dot level value for the pertinent pixel in the black color separation. If a threshold value is greater than zero and less than or equal to K, a dot is placed at the corresponding position.

The dot placement range in the cyan channel, graph 84 has a lower bound 86 of K and an upper bound 88 of K+C, i.e., the sum of the K channel dot level and the C channel dot level. Thus, the dot placement range for cyan includes the inter-channel offset between the black and cyan color channels. The magenta channel graph 90 has a lower bound 92 of K+C and an upper bound 94 of K+C+M. In practice, however, the upper bound may be (K+C+M)mod, where the mod function produces the remainder (with respect to the maximum threshold array value) in the event the upper bound exceeds the maximum threshold array value. The mod function could be applicable to any of the cyan, magenta, or yellow channels, depending on their values (including the inter-channel offset) relative to the threshold maximum. In the example of FIG. 6, upper bound 94 exceeds the maximum threshold array value, requiring the calculation of a wrap-around upper bound 96. Finally, for the yellow channel graph 98, the dot placement range has a lower bound 100 of (K+C+M)mod and an upper bound 102 of (K+C+M)mod+Y.

In each case, as shown in FIG. 6, the lower bound for a color channel is the upper bound for a preceding color channel, with the exception of black where the lower bound is zero. Also, with the exception of black, the upper bound is the sum of the upper bound for a preceding color channel and the pixel value, i.e., dot placement number, of the present color channel. In this manner, the halftoning technique applied to each color channel makes use of an inter-channel offset that offsets the dot placement ranges from one channel to another to promote improved dot spacing. If a threshold value falls within the dot placement range, a dot is placed for the respective pixel and color channel. If a threshold value does not fall within the pertinent dot placement range, a dot is not placed at the corresponding pixel position.

Figure 7:
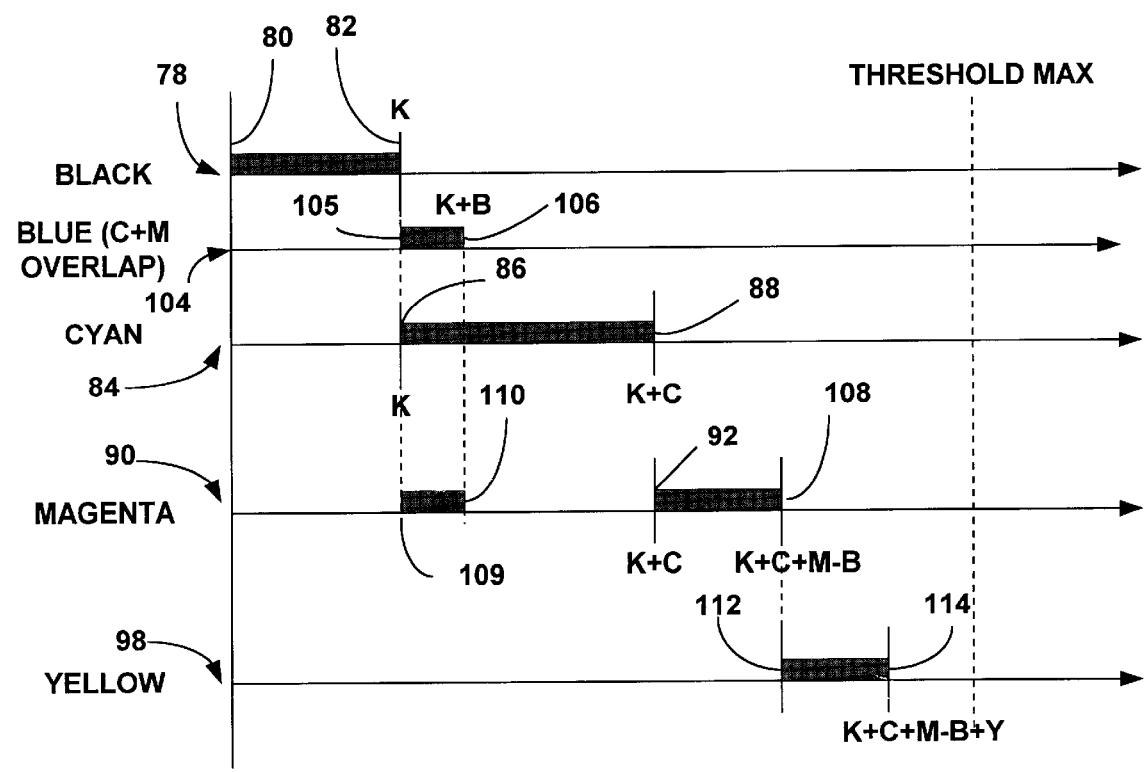
FIG. 7 is a graph illustrating application of an alternative method for improved inter-channel dot spacing to a range of threshold array value.

FIG. 7 is a graph illustrating application of an alternative method for improved inter-channel dot spacing to a range of threshold array values. The shaded regions represent the range of threshold values for which a halftone dot would be placed. Like the graph of FIG. 6, the graph of FIG. 7 includes a linear graph for each of the black, cyan, magenta, and yellow color channels. The graph of FIG. 7 further illustrates, however, a linear graph 104 corresponding to a blue component formed by a controlled amount of overlap of cyan and magenta colorants. The approach illustrated in FIG. 7 conforms in general to that shown in FIG. 6, but also permits reuse of dots for cyan and magenta to a limited degree proportional to the total number of higher-density dots, e.g., K+C+M. In particular, the K+B overlap (blue) component has a lower bound 105 and an upper bound 106 that define a range for placement of dots in both the cyan and magenta color channels, permitting limited dot reuse and overlap. Note that for simplicity FIG. 7 does not indicate the need for wrap-around, but in practice wrap-around may occur as many as N−1 times per pixel for N-color image data. The cyan dot placement range, as in the example of FIG. 6, depends on the value of K and has a lower bound equal to K and an upper bound equal to K+C. The magenta dot placement range has a first dot placement range with a first lower bound 92 equal to K+C and a first upper bound 108 equal to K+C+M−B. Thus, upper bound 108 for the magenta channel 108 is determined based on the values for black and cyan and the blue overlap value. The magenta dot placement range also has a second dot placement range with a second lower bound 109 equal to K and a second upper bound 110 equal to K+B. For magenta, if a threshold value is greater than first lower bound 92 and less than or equal to first upper bound 108, or greater than second lower bound 109 and less than or equal to second upper bound 110, a dot is placed. The yellow channel has a dot placement range with a lower bound 112 equal to K+C+M−B and an upper bound equal 114 equal to K+C+M−B+Y. As in the example of FIG. 6, the threshold range is shifted for a given channel's dot placement by the sum of the contone values of all of the channels that have been halftoned before it.

The amount of the blue overlap component can be calculated according to a function such as B=f(T)*min[C,M], where T=K+C+M and f(T) is a function that determines an acceptable degree of overlap based on the total number of higher density dots (K, C, and M) being placed. Values of the function f(T) can be computed, for example, as illustrated in the following exemplary lines of C code:

```
double f(unsigned int T)    // T will be in range [0, 3*255]
{
  double fT;
  if(T == 0) {
    fT = 0.0;
  }
  else if(T>=2*256) { // complete overlap allowed if the equivalent of
    // 2 solids greater dots are present
    fT = 1.0;
  }
  else {
    const double width = 0.15;   // fixed parameters
    const double slope = 4.0;
    const double ctr = 0.9 + width;
    double tmp = T/256.0;    // normalize spot sum to [0,3] range
    double norm = (tmp−ctr)/width;
    double expN = exp(norm);
    fT = ((1.0+slope*expN) / ( (1.0−slope*slope) +
      (1.0+slope*exp(−norm))*(1.0+slope*expN) ));
  }
  return(fT);
}
```

The values computed by the above C source code represent the fraction of cyan and magenta dots which may be overlapped for a particular value of T, assuming a maximum color pixel value of 255. The acceptable degree of overlap embodied in the function will be a matter of design according to the particular printing process and individual aesthetic standards. Typical implementations of the function f(T) will be zero at T=0 and smoothly transition to 1.0 at T=2 since solid magenta over solid cyan (corresponding to T=2) requires complete overprinting of the cyan and magenta dots.

A number of optional implementations are conceivable. For example, because the yellow colorant is often light and transparent, its overprints with the other colorants differ very little in lightness from the other colorants alone. In these cases, yellow could be excluded from a dot placement process as described herein, and a standard thresholding method used in its place. In other words, dots could be placed for yellow without regard to dot placements for preceding channels, e.g., black, cyan, and magenta. Another option would be to center the yellow range on the border of the cyan and magenta dot placement ranges so as to overprint equal numbers of cyan and magenta dots with yellow dots. In settings where some form of UCR or GCR is used to exclude black from highlight regions, black dots will begin to appear in the darker parts of the tone scale. As a further option, black may be excluded from a dot placement process as described herein in such cases as there will be reduced contrast between the black dots and the CMY dots in these darker shades.

A number of embodiments of the present invention have been described. Nevertheless, it will be understood that various modifications may be made without departing from the spirit and scope of the invention. Accordingly, other embodiments are within the scope of the following claims.

What is claimed is:

1. A method comprising:
    placing dots in a first halftone dot pattern for threshold array values that are less than or equal to a first color pixel value, wherein the first color pixel value is a black color pixel value;
    defining a dot placement range within the threshold array values for a second color pixel value; and
    placing dots in a second halftone dot pattern for threshold array values that fall within the dot placement range, wherein the dot placement range has a lower bound as a function of the first color pixel value and an upper bound as a function of the sum of the first and second color pixel values, and wherein placing dots in the second halftone dot pattern includes placing dots in the second halftone dot pattern for threshold array values that are greater than or equal to the lower bound and less than or equal to the upper bound; and
    in the event the upper bound of the dot placement range exceeds a maximum threshold array value, assigning a wrap-around threshold array value as the upper bound, and placing dots in the second halftone dot pattern for threshold array values that are greater than or equal to the lower bound or less than or equal to the upper bound such that at least some of the dots in the second halftone dot pattern are placed at overlapping positions corresponding to at least some of the dots in the first halftone dot pattern.

2. The method of claim 1, wherein the wrap-around threshold array value is determined by application of a modulo function to the upper bound and the maximum threshold array value.

3. The method of claim 2, wherein second color pixel values is a cyan, magenta, or yellow pixel value.

4. The method of claim 2, wherein the dot placement range is a first dot placement range, the method further comprising:
defining a second dot placement range within the threshold array values for a third color pixel value, wherein the second dot placement range has a lower bound as a function of the sum of the first and second color pixel values and an upper bound as a function of the sum of the first, second, and third color pixel values; and
placing dots in a third halftone dot pattern for threshold array values that fall within the second dot placement range.

5. The method of claim 4, further comprising placing dots in the third halftone dot pattern for threshold array values that are greater than or equal to the lower bound of the second dot placement range and less than or equal to the upper bound of the second dot placement range.

6. The method of claim 4, further comprising, in the event the upper bound of the second dot placement range exceeds a maximum threshold array value, assigning a wrap-around threshold array value as the upper bound of the second dot placement range, the wrap-around threshold array value being determined by application of a modulo function to the upper bound of the second dot placement range and the maximum threshold array value, and placing dots in the third halftone dot pattern for threshold array values that are greater than or equal to the lower bound or less than or equal to the upper bound such that overlapping occurs.

7. The method of claim 4, wherein each of the second; and third color pixel values is a cyan, magenta, or yellow pixel value.

8. The method of claim 4, wherein the color corresponding to the second color pixel value has a density that is greater than or equal to a density of a color corresponding to a third color pixel value.

9. The method of claim 4, wherein the second color pixel value is a cyan color pixel value, and the third color pixel value is a magenta color pixel value.

10. The method of claim 4, further comprising:
defining a third dot placement range within the threshold array values for a fourth color pixel value, wherein the third dot placement range has a lower bound as a function of the sum of the first, second, and third color pixel values and an upper bound as a function of the sum of the first, second, third, fourth color pixel values;
placing dots in a fourth halftone dot pattern for threshold array values that fall within the third dot placement range.

11. The method of claim 10, further comprising placing dots in the fourth halftone dot pattern for threshold array values that are greater than or equal to the lower bound of the third dot placement range and less than or equal to the upper bound of the third dot placement range.

12. The method of claim 10, further comprising, in the event the upper bound of the third dot placement range exceeds a maximum threshold array value, assigning a wrap-around threshold array value as the upper bound of the third dot placement range, the wrap-around threshold array value being determined by application of a modulo function to the upper bound of the third dot placement range and the maximum threshold array value, and placing dots in the fourth halftone dot pattern for threshold array values that are greater than or equal to the lower bound or less than or equal to the upper bound such that overlapping occurs.

13. The method of claim 10, wherein each of the second, third, and fourth color pixel values is a cyan, magenta, or yellow pixel value.

14. The method of claim 10, wherein the color corresponding to the second color pixel value has a density that is greater than or equal to a density of a color corresponding to a third color pixel value, and the color corresponding to the third color pixel value has a density that is greater than or equal to a color corresponding to the fourth color pixel value.

15. The method of claim 10, wherein the second color pixel value is a cyan color pixel value, the third color pixel value is a magenta color pixel value, and the fourth color pixel value is a yellow color pixel value.

16. The method of claim 10, further comprising applying the threshold array values at various positions spanning an image to form a plurality of the first, second, third, and fourth halftone dot patterns and thereby form a multi-color halftone representation of the image.

17. The method of claim 10, further comprising combining the first, second, third, and fourth halftone dot patterns as overprint color separation bitmaps to form a representation of at least a portion of a multi-color image.

18. The method of claim 10, further comprising defining the threshold array values according to a stochastic halftone mask.

19. The method of claim 10, further comprising defining the threshold array values according to a blue noise mask.

20. The method of claim 1, further comprising defining the threshold array values according to a stochastic halftone mask.

21. The method of claim 1, further comprising defining the threshold array values according to a blue noise mask.

22. The method of claim 1, wherein the dot placement range is a first dot placement range, the method further comprising defining a second dot placement range within the threshold array values for a third color pixel value, wherein the second dot placement range overlaps with a portion of the first dot placement range such that at least some of the dots in a third halftone dot pattern are placed at overlapping position corresponding to at least some of the dots in the second halftone dot pattern.

23. The method of claim 22, wherein the second color pixel value is cyan and the third color pixel value is magenta, and a selected number of the dots in the third halftone dot pattern are placed at overlapping positions corresponding to a selected number of the dots in the second halftone dot pattern to generate a blue color component.

24. The computer-readable medium of claim 22, wherein the second color pixel value is cyan and the third color pixel value is magenta, and a selected number of the dots in the third halftone dot pattern are placed at overlapping positions corresponding to a selected number of the dots in the second halftone dot pattern to generate a blue color component.

25. A method comprising:
placing dots in a first halftone dot pattern for threshold array values that are less than or equal to a black color pixel value;
defining a first dot placement range within the threshold array values for a cyan color pixel value;
placing dots in a second halftone dot pattern for threshold array values that fall within the first dot placement range;
defining a second dot placement range within the threshold array values for a magenta color pixel value, wherein the second dot placement range has a lower bound as a function of the sum of the black and cyan color pixel values and an upper bound as a function of the sum of the black, cyan and magenta color pixel values;

placing dots in a fourth halftone dot pattern for threshold array values that fall within the second dot placement range;

defining a third dot placement range within the threshold array values for a yellow color pixel value, wherein the third dot placement range has a lower bound as a function of the sum of the black, cyan and magenta color pixel values and an upper bound as a function of the sum of the black, cyan, magenta, and yellow color pixel values;

placing dots in a fourth halftone dot patterns for threshold array values that fall within the third dot placement range; and in the event the upper bound of any of the first, second, and third dot placement ranges exceeds a maximum threshold array value, assigning a wrap-around threshold array value as the upper bound of the respective dot placement range, and placing dots in the respective halftone dot pattern for threshold array values that are greater than or equal to the lower bound or less than or equal to the upper bound such that overlapping occurs.

26. The method of claim 25, further comprising combining the first, second, third, and fourth halftone dot patterns as overprint color separation bitmaps to form a representation of at least a portion of a multi-color image.

27. The method of claim 25, further comprising defining the threshold array values according to a stochastic halftone mask.

28. The method of claim 25, further comprising defining the threshold array values according to a blue noise mask.

29. A computer-readable medium containing program code that, when executed by a processor:

places dots in a first halftone dot pattern for threshold array values that are less than or equal to a first color pixel value, wherein the first color pixel value is a black color pixel value;

defines a dot placement range within the threshold array values for a second color pixel value;

places dot in a second halftone dot pattern for threshold array values that fall within the dot placement range, wherein the dot placement range has a lower bound as a function of the first color pixel value and an upper bound as a function of the sum of the first and second color pixel values, wherein placing dots in the second halftone dot pattern includes placing dots in the second halftone dot pattern for threshold array values that are greater than or equal to the lower bound and less than or equal to the upper bound; and in the event the upper bound of the dot placement range exceeds a maximum threshold array value, the program code assigns a wrap-around threshold array value as the upper bound, and places dots in the second halftone dot pattern for threshold array values that are greater than or equal to the lower bound or less than or equal to the upper bound such that at least some of the dots in the second halftone dot pattern are placed at overlapping positions corresponding to at least some of the dots in the first halftone dot pattern.

30. The computer-readable medium of claim 29, wherein the wrap-around threshold array value is determined by application of a modulo function to the upper bound and the maximum threshold array value.

31. The computer-readable medium of claim 30, wherein second color pixel values is a cyan, magenta, or yellow pixel value.

32. The computer-readable medium of claim 30, wherein the dot placement range is a first dot placement range, and the program code:

defines a second dot placement range within the threshold array values for a third color pixel value, wherein the second dot placement range has a lower bound as a function of the sum of the first and second color pixel values and an upper bound as a function of the sum of the first, second, and third color pixel values; and places dots in a third halftone dot pattern for threshold array values that fall within the second dot placement range.

33. The computer-readable medium of claim 32, wherein the program code places dots in the third halftone dot pattern for threshold array values that are greater than or equal to the lower bound of the second dot placement range and less than or equal to the upper bound of the second dot placement range.

34. The computer-readable medium of claim 32, wherein the program code, in the event the upper bound of the second dot placement range exceeds a maximum threshold array value, assigns a wrap-around threshold array value as the upper bound of the second dot placement range, the wrap-around threshold array value being determined by application of a modulo function to the upper bound of the second dot placement range and the maximum threshold array value, and places dots in the third halftone dot pattern for threshold array values that are greater than or equal to the lower bound or less than or equal to the upper bound such that overlapping occurs.

35. The computer-readable medium of claim 32, wherein each of the second, and third color pixel values is a cyan, magenta, or yellow pixel value.

36. The computer-readable medium of claim 32, wherein the color corresponding to the second color pixel value has a density that is greater than or equal to a density of a color corresponding to the third color pixel value.

37. The computer-readable medium of claim 32, wherein the second color pixel value is a cyan color pixel value, and the third color pixel value is a magenta color pixel value.

38. The computer-readable medium of claim 32, wherein the program code:

defines a third dot placement range within the threshold array values for a fourth color pixel value, wherein the third dot placement range has a lower bound as a function of the sum of the first, second, and third color pixel values and an upper bound as a function of the sum of the first, second, third, fourth color pixel values;

places dots in a fourth halftone dot pattern for threshold array values that fall within the third dot placement range.

39. The computer-readable medium of claim 38, wherein the program code places dots in the fourth halftone dot pattern for threshold array values that are greater than or equal to the lower bound of the third dot placement range and less than or equal to the upper bound of the third dot placement range.

40. The computer-readable medium of claim 38, wherein the program code, in the even the upper bound of the third dot placement range exceeds a maximum threshold array value, assigns a wrap-around threshold array value as the upper bound of the third dot placement range, the wrap-around threshold array value being determined by application of a modulo function to the upper bound of the third dot placement range and the maximum threshold array value, and places dots in the fourth halftone dot pattern for threshold array values that are greater than or equal to the lower bound or less than or equal to the upper bound such that overlapping occurs.

41. The computer-readable medium of claim 38, wherein each of the second, third, and fourth color pixel values is a black, cyan, magenta, or yellow pixel value.

42. The computer-readable medium of claim 38, wherein the color corresponding to the second color pixel value has a density that is grater than or equal to a density of a color corresponding to a third color pixel value, and the color corresponding to the third color pixel value has a density that is greater than or equal to a color corresponding to the fourth color pixel value.

43. The computer-readable medium of claim 38, wherein the second color pixel value is a cyan color pixel value, the third color pixel value is a magenta color pixel value, and the fourth color pixel value is a yellow color pixel value.

44. The computer-readable medium of claim 38, wherein the program code applies the threshold array values at various positions spanning an image to form a plurality of the first, second, third, and fourth halftone dot patterns and thereby form a multi-color halftone representation of the image.

45. The computer-readable medium of claim 38, wherein the program code combines the first, second, third, and fourth halftone dot patterns as overprint color separation bitmaps to form a representation of at least a portion of a multi-color image.

46. The computer-readable medium of claim 38, wherein the program code defines the threshold array values according to a stochastic halftone mask.

47. The computer-readable medium of claim 38, wherein the program code defines the threshold array according to a blue noise mask.

48. The computer-readable medium of claim 29, wherein the program code defines the threshold array values according to a stochastic halftone mask.

49. The computer-readable medium of claim 29, wherein the program code defines the threshold array values according to a blue noise mask.

50. The computer-readable medium of claim 29, wherein the dot placement range is a first dot placement range, wherein the program code defines a second dot placement range within the threshold array values for a third color pixel value, wherein the second dot placement range overlaps with a portion of the first dot placement range such that at least some of the dots in a third halftone dot pattern are placed at overlapping positions corresponding to at least some of the dots in the second halftone dot pattern.

51. A computer-readable medium containing program code that, when executed by a processors:
   places dots in a first halftone dot pattern for threshold array values that are less than or equal to black color pixel value;
   defines a first dot placement range within the threshold array values for a cyan color pixel value;
   places dots in a second halftone dot pattern for threshold array values that fall within the first dot placement range;
   defines a second dot placement range within the threshold array values for a magenta color pixel value, wherein the second dot placement range has a lower bound as a function of the sum of the black and cyan color pixel values and a upper bound as a function of
   places dots in a fourth halftone dot pattern for threshold array values that fall within the third dot placement range; and
   in the event the upper bound of any first, second, and third dot placement ranges exceeds a maximum threshold array value, assigns a wrap-around threshold array value as the upper bound of the respective dot placement range, and places dots in the respective halftone dot pattern for threshold array values that are greater than or equal to the respective lower bound or less than or equal to the respective upper bound such that overlapping occurs.

52. The computer-readable medium of claim 51, wherein the wrap-around threshold array value is determined by application of a modulo function to the respective upper bound and the maximum threshold array value.

53. The computer-readable medium of claim 51, wherein the program code combines the fit, second, third, and fourth halftone dot patterns as overprint color separation bitmaps to form a representation of at least a portion of a multi-color image.

54. The computer-readable medium of claim 51, wherein the threshold array values are defined according to a stochastic halftone mask.

55. The computer-readable medium of claim 51, wherein the threshold array values are defined according to a blue noise mask.

56. A method comprising:
   placing dots in a first halftone dot pattern for threshold array values that are less than or equal to a first color pixel value;
   defining a first dot placement range within the threshold array values for a second color pixel value; and
   placing dots in a second halftone dot pattern for threshold array values that fall within the first dot placement range, wherein the first dot placement range has a lower bound as a function of the first color pixel value and an upper bound as a function of the sum of the first and second color pixel values, and wherein placing dots in the second halftone dot pattern includes placing dots in the second halftone dot pattern for threshold array values that are greater than or equal to the lower bound and less than or equal to the upper bound; and
   defining a second dot placement range within the threshold array values for a third color pixel value, wherein the second dot placement range overlaps with a portion of the first dot placement range such that at least some of the dots in a third halftone dot pattern are placed at overlapping positions corresponding to at least some of the dots in the second halftone dot pattern, and wherein the second color pixel value is cyan and the third color pixel value is magenta, and a selected number of the dots in the third halftone dot pattern are placed at overlapping positions corresponding to a selected number of the dots in the second halftone dot pattern to generate a blue color component.

57. A computer-readable medium containing program code that, when executed by a processor:
   places dots in a first halftone dot pattern for threshold array values that are less than or equal to a first color pixel value;
   defines a first dot placement range within the threshold array values for a second color pixel value;
   places dot in a second halftone dot pattern for threshold array values that fall within the first dot placement range, wherein the first dot placement range has a lower bound as a function of the first color pixel value and an upper bound as a function of the sum of the first and second color pixel values, wherein placing dots in the second halftone dot pattern includes placing dots in the second halftone dot pattern for threshold array values that are greater than or equal to the lower bound and less than or equal to the upper bound; and
   defines a second dot placement range within the threshold array values for a third color pixel value, wherein the second dot placement range overlaps with a portion of the first dot placement range such that at least some of the dots in a third halftone dot pattern are placed at overlapping positions corresponding to at least some of the dots in the second halftone dot pattern, and wherein the second color pixel value is cyan and the third color pixel value is magenta, and a selected number of the dots in the third halftone dot pattern are placed at overlapping positions corresponding to a selected number of the dots in the second halftone dot pattern to generate a blue color component.

* * * * *